(12) United States Patent
Fujiwara et al.

(10) Patent No.: US 10,974,110 B2
(45) Date of Patent: Apr. 13, 2021

(54) GOLF SHAFT

(71) Applicant: NHK Spring Co., Ltd., Yokohama (JP)

(72) Inventors: Kosuke Fujiwara, Yokohama (JP); Akihisa Inoue, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 16/321,289

(22) PCT Filed: May 17, 2018

(86) PCT No.: PCT/JP2018/019201
§ 371 (c)(1),
(2) Date: Jan. 28, 2019

(87) PCT Pub. No.: WO2018/235475
PCT Pub. Date: Dec. 27, 2018

(65) Prior Publication Data
US 2020/0108300 A1 Apr. 9, 2020

(30) Foreign Application Priority Data

Jun. 23, 2017 (JP) .............................. JP2017-123343

(51) Int. Cl.
*A63B 53/10* (2015.01)
*A63B 53/12* (2015.01)
(Continued)

(52) U.S. Cl.
CPC ................. *A63B 53/10* (2013.01); *C09J 1/00* (2013.01); *C09J 163/00* (2013.01);
(Continued)

(58) Field of Classification Search
CPC ..... A63B 53/10; A63B 2209/02; A63B 53/12; C09J 1/00; C09J 163/00; C08K 3/041; C08K 5/0025; C08K 5/17
See application file for complete search history.

(56) References Cited

U.S. PATENT DOCUMENTS 4,721,799 A * 1/1988 Newman-Evans ......................... C07D 303/36 549/552
5,637,179 A * 6/1997 Nakayama .............. C08G 59/18 156/330
(Continued)

FOREIGN PATENT DOCUMENTS

GB 2241240 A * 8/1991 ............ C08F 220/26
JP 53080000 A * 7/1978
(Continued)

OTHER PUBLICATIONS

Effect of carbon nanotube modified epoxy adesive on CFRP-to-steel interface. ScienceDirection, Elsevier, Asghar H. Korayem, Mar. 24, 2015 www.elsevier.com/locate/compositesb.*

*Primary Examiner* — Stephen L Blau
(74) *Attorney, Agent, or Firm* — Norris McLaughlin, P.A.

(57) ABSTRACT

Provided is a golf shaft comprising an element tube made of steel, a plating layer formed on an outer periphery of the element tube, an outer layer covering the plating layer, an adhesive layer interposed between the plating layer and the outer layer to bond between the plating layer and the outer layer. The outer layer is formed of a fiber reinforced plastic having a matrix resin that is an epoxy resin, and the adhesive layer is an epoxy resin composition or a carbon nano tube resin composition, the epoxy resin composition comprising an epoxy resin and a mixed curing agent in which two or more kinds of amine-based curing agents are mixed, and the carbon nano tube resin composition comprising an epoxy
(Continued)

resin and at least one kind of curing agents as well as dispersed carbon nano tubes.

2 Claims, 5 Drawing Sheets

(51) Int. Cl.
*C09J 1/00* (2006.01)
*C09J 163/00* (2006.01)
*C08K 3/04* (2006.01)
*C08K 5/00* (2006.01)
*C08K 5/17* (2006.01)

(52) U.S. Cl.
CPC .......... *A63B 2209/02* (2013.01); *C08K 3/041* (2017.05); *C08K 5/0025* (2013.01); *C08K 5/17* (2013.01)

(56) References Cited

U.S. PATENT DOCUMENTS

| | | | | |
|---|---|---|---|---|
| 7,128,664 | B2 * | 10/2006 | Onoda | A63B 53/0466 |
| | | | | 473/347 |
| 10,675,843 | B2 * | 6/2020 | Zhao | B32B 27/38 |
| 2010/0317457 | A1 * | 12/2010 | Hulock | A63B 53/10 |
| | | | | 473/320 |

FOREIGN PATENT DOCUMENTS

| | | | |
|---|---|---|---|
| JP | 53-134686 | A | 11/1978 |
| JP | 5-34672 | Y2 | 9/1993 |
| JP | 2002-253715 | A | 9/2002 |
| JP | 2007-009075 | A | 1/2007 |
| JP | 2010-253035 | A | 11/2010 |
| JP | 2017-105995 | A | 6/2017 |
| WO | 2009/078373 | A1 | 6/2009 |

\* cited by examiner

GOLF SHAFT

FIELD OF THE INVENTION

The present invention relates to a golf shaft in which an element tube made of steel is covered with an outer layer made of a fiber reinforced plastic.

BACKGROUND OF THE INVENTION

As a golf shaft, there is one in which an element tube made of steel has a thinned wall thickness and its outer periphery is covered with an outer layer made of a fiber reinforced plastic in order to reduce a weight while remaining feeling of a golf shaft made of steel.

In such a golf shaft, plating is applied to an outer peripheral surface of the element tube made of steel for rust prevention and the like and therefore there is a problem that adhesion of the outer layer to the element tube is poor.

In this regard, the Patent document 1 interposes a non-woven fabric inner layer between an element tube and an outer layer to improve adhesion between the element tube and the outer layer.

Since the Patent document 1, however, is not sufficient for adhesion between the element tube and the outer layer and compensates the adhesion by lapping a surface of the element tube, there is a problem of increasing manufacturing processes.

PATENT DOCUMENT 1: JP H05-34672Y

SUMMARY OF THE INVENTION

A problem to be solved is that sufficient adhesion cannot be obtained without lapping a surface of an element tube.

In order to obtain sufficient adhesion without lapping a surface of an element tube, the present invention provides a golf shaft comprising an element tube made of steel, a plating layer formed on an outer periphery of the element tube, an outer layer covering the plating layer, an adhesive layer interposed between the plating layer and the outer layer to bond between the plating layer and the outer layer, wherein the outer layer is formed of a fiber reinforced plastic having a matrix resin that is an epoxy resin, and the adhesive layer is an epoxy resin composition or a carbon nano tube resin composition, the epoxy resin composition comprising an epoxy resin and a mixed curing agent in which two or more kinds of amine-based curing agents are mixed, and the carbon nano tube resin composition comprising an epoxy resin and at least one kind of curing agents as well as dispersed carbon nano tubes.

The present invention secures sufficient adhesion between the outer layer and the element tube without lapping the plating layer being a surface of the element tube by interposition of the adhesive layer having high adhesion relative to the outer layer and the plating layer.

BRIEF DESCRIPTION OF THE DRAWINGS

FIGS. 1(A) and 1(B) are side views of a golf shaft in which FIG. 1(A) illustrates the entire golf shaft and FIG. 1(B) illustrates enlarged part of (A) according to the Embodiment 1 of the present invention;

EMBODIMENT FOR CARRYING OUT THE INVENTION

The present invention accomplishes the object of obtaining sufficient adhesion without lapping a surface of an element tube by an adhesive layer having high adhesion with respect to a plating layer of the surface of the element tube and an outer layer.

In particular, the outer layer is a fiber reinforced plastic having a matrix resin that an is an epoxy resin, and the adhesive layer is an epoxy resin composition or a carbon nano tube resin composition, the epoxy resin composition comprising an epoxy resin and a mixed curing agent in which two or more kinds of amine-based curing agents are mixed, and the carbon nano tube resin composition comprising an epoxy resin and at least one kind of curing agents as well as dispersed carbon nano tubes.

If the adhesive layer is the epoxy resin composition, the amine-based curing agents may be two or more different kinds of amine-based curing agents selected from aliphatic polyamine, alicyclic polyamine, aromatic polyamine, and polyamideamine.

In this case, the amine-based curing agents may be two kinds of amine-based curing agents in which one is triethylenetetramine and another one is polyamideamine that are blended so that there is more polyamideamine than triethylenetetramine.

If the adhesive layer is the carbon nano tube resin composition, the adhesive layer may comprise the epoxy resin and at least one kind of curing agents as well as the dispersed carbon nano tube.

In this case, the curing agents may be amine-based curing agents and/or acid anhydride-based curing agents.

Figure 1:
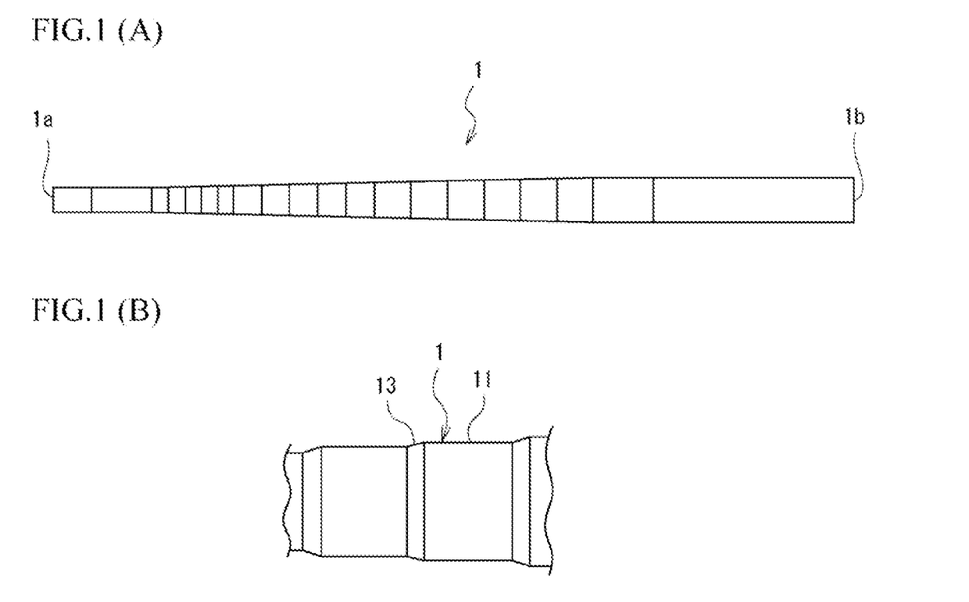
Figure 2:
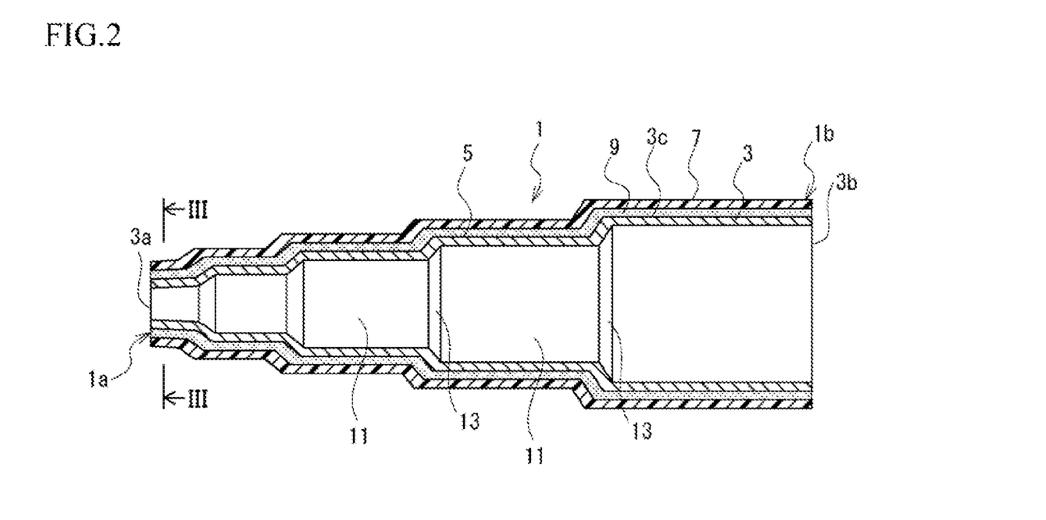
FIG. 2 is a schematic longitudinal sectional view of the golf shaft of FIG. 1.
Figure 3:
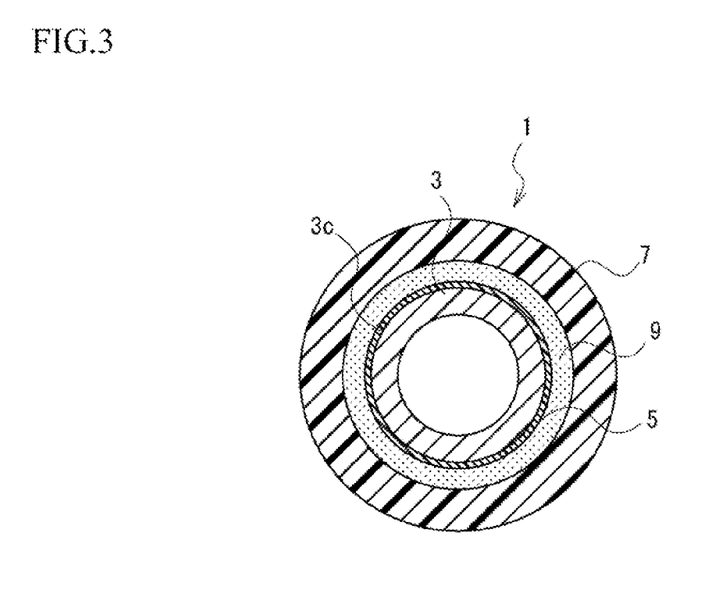
FIG. 3 is a schematic cross sectional view of the golf shaft taken along a line of FIG. 2.

FIG. 1 is a set of side views of a golf shaft in which FIG. 1(A) illustrates the entire golf shaft and FIG. 1(B) illustrates enlarged part of FIG. 1(A). FIG. 2 is a schematic longitudinal sectional view of the golf shaft of FIG. 1. FIG. 3 is a schematic cross sectional view of the golf shaft taken along a line of FIG. 2. It should be noted that, though FIGS. 1-3 do not correspond with each other in a dimension of each part, they are basically the same structure.

A golf shaft 1 is formed into a tube and has a front end 1a in an axial direction being a portion to which a head of a golf club is attached and a base end 1b in the axial direction being a portion to which a grip of the golf club is attached.

The golf shaft 1 according to the embodiment is configured to be provided with an element tube 3, a plating layer 5, an outer layer 7, and an adhesive layer 9.

The element tube 3 comprises a hollow tubular shaft made of steel, a sectional shape in a cross section of which is circular. The element tube 3 according to the embodiment has a stepped shape formed by a plurality of straight tube parts 11 and a plurality of tapered tube parts 13 connecting adjacent straight tube parts 11.

The straight tube part 11 is a portion having a constant wall thickness and constant inner and outer diameters. In adjacent straight tube parts 11, the straight tube part 11 located on a side of a butt end 3b of the element tube 3 has larger inner and outer diameters and a thinner wall thickness than of the straight tube part 11 located on a side of the tip end 3a of the element tube 3.

The tapered tube part 13 absorbs differences in diameters and wall thickness between adjacent straight tube parts 11 and has diameters of inner and outer peripheries gradually increasing from the side on the tip end 3a toward the side on the butt end 3b and a wall thickness gradually thinning from the side on the tip end toward the side on the butt end. The tapered tube part 13 has a length in the axial direction shorter than of the straight tube part 11.

In the element tube 3 according to the embodiment, the outer diameter is 14.50 mm at the largest portion and the wall thickness of that portion is 0.206 mm. On the other hand, the outer diameter is 8.00 mm at the smallest portion and the wall thickness of that portion is 0.294 mm.

It should be noted that the element tube 3 is not limited to the stepped shape, but it may be formed into a straight shape with a constant diameter of an outer periphery or an entirely tapered tubular shape. Further, the wall thickness of the element tube 3 may be constant in the axial direction or partially changed. Furthermore, the sectional shape in the cross section of the element tube 3 is not limited to the circular shape and may be an oval shape or the like appropriately selected.

The plating layer 5 is provided on a whole outer peripheral surface 3c of the element tube 3 and forms a top surface of the element tube 3. As the plating layer 5, a plating of, for example, copper, nickel, chrome, zinc, tin, gold, or the like may be used, and a chrome plating is applied besides two nickel platings are overlaid according to the present embodiment.

A wall thickness of the plating layer 5 is very thin relative to the wall thickness of the element tube 3, and is approximate 0.0103 mm being the sum of each nickel plating that is 0.005 mm and the chrome plating that is 0.0003 mm. The wall thickness of the plating layer 5 is, however, not limited thereto.

The outer layer 7 is a tubular shape covering the plating layer 5 and is formed of a fiber reinforced plastic having a matrix resin that is an epoxy resin and a reinforcement that is a fiber sheet. It should be noted that, though the outer layer 7 according to the present embodiment covers the whole plating layer 5, it may cover part of the plating layer 5 in the axial direction.

The outer layer 7 is formed by winding prepregs 17 detailed later (FIGS. 4 and 5) around the element tube 3 through the adhesive layer 9 and heating them. The prepreg 17 is a fiber reinforced plastic sheet in which an epoxy resin containing a curing agent is impregnated into a fiber sheet.

The curing agent used for the outer layer 7 is selected one of aliphatic polyamine, alicyclic polyamine, aromatic polyamine, polyamideamine or the like.

For the fiber sheet, inorganic fiber such as metal fiber, boron fiber, carbon fiber, glass fiber and ceramics fiber, aramid fiber, other high tension synthetic fibers or the like may be used. The inorganic fiber is preferably used because it is lightweight and has high tension. In particular, the carbon fiber has superior specific strength and specific rigidity and is the most suitable. The present embodiment, therefore, uses the carbon fiber as the fiber sheet.

It should be noted that the outer layer 7 in FIG. 1 is formed so as to follow the plating layer 5 and has a stepped shape. The outer layer 7, however, is cut at the time of manufacturing the golf shaft 1 and therefore may not actually have the stepped shape according to a cutting condition in many cases.

Accordingly, the wall thickness of the outer layer 7 changes in the axial direction and is set within a range thicker than the wall thickness of the element tube 3. According to the present embodiment, the wall thickness of the outer layer 7 is approximately 0.700 mm at the thickest portion and is approximately 0.330 mm at the thinnest portion. The wall thickness of the outer layer 7 may be, however, in a range of 1.000 mm-0.200 mm according to a design.

The adhesive layer 9 is interposed between the plating layer 5 and the outer layer 7 and has a tubular shape bonding between the plating layer 5 and the outer layer 7. The adhesive layer 9 according to the present embodiment is formed so as to follow the plating layer 5 and has a stepped shape.

A wall thickness of the adhesive layer 9 is approximately constant and is thinner than the wall thickness of the outer layer 7 and the element tube 3. The wall thickness of the adhesive layer 9 according to the present embodiment is approximate 0.02 mm. The wall thickness of the adhesive layer 9 is not limited thereto, but it may be changed within a range capable of bonding between the plating layer 5 and the outer layer 7.

The adhesive layer 9 comprises an epoxy resin composition comprising an epoxy resin and a mixed curing agent in which two or more kinds of amine-based curing agents are mixed. The adhesive layer 9 has higher adhesion relative to the plating layer 5 and the outer layer 7 than adhesion for directly bonding the plating layer 5 and the outer layer 7.

For the adhesive layer 9 according to the embodiment, a clear paint is used. In particular, it is formed by heating and curing an adhesive layer agent 15 (FIG. 4) in which a liquid epoxy resin and a liquid mixed curing agent of the clear paint are mixed in a ratio of 2 to 1.

The liquid epoxy resin contains 73.96% resin component, 25.77% solvent, and 0.27% additive. The liquid curing agent contains 64.82% resin component, 26.82% solvent, and 8.36% additive.

The uncured adhesive layer agent 15, therefore, contains approximate 70% resin component, approximate 26% solvent, and approximate 3% additive according to the aforementioned mixing. It should be noted that the content ratio is an example and may be changed appropriately.

The resin component of the adhesive layer agent comprises the epoxy resin and the amine-based curing agents. As the amine-based curing agents, there are for example, aliphatic polyamine, alicyclic polyamine, aromatic polyamine, polyamideamine and the like. The two or more kinds of amine-based curing agents are two or more different kinds of amine-based curing agents selected from the amine-based curing agents.

According to the present embodiment, two kinds in which one is triethylenetetramine that is the aliphatic polyamine and another one is the polyamideamine are used. The blending ratio in this case is set so that there is more polyamideamine than triethylenetetramine. In particular, the triethylenetetramine is approximate 4% with respect to the polyamideamine.

The solvent of the adhesive layer agent is xylene, methyl isobutyl ketone, isobutanol, ethylene glycol monobutyl ether, toluene or the like. The additive of the adhesive layer agent may be a coupling agent such as silane coupling and the like.

Figure 4:
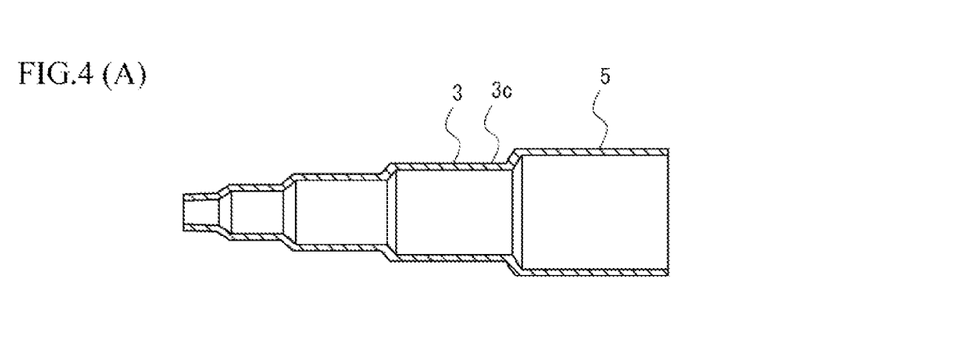
FIGS. 4(A) to (D) are schematic longitudinal sectional views illustrating manufacturing process of the golf shaft according to the Embodiment 1.

FIG. 4 is a set of schematic longitudinal sectional views illustrating manufacturing process of the golf shaft 1.

In the manufacturing according to the present embodiment, the element tube 3 having the stepped shape with the outer peripheral surface 3c on which the plating layer 5 is formed is prepared as illustrated in FIG. 4(A), first. On the surface of the plating layer 5 of the element tube 3, the adhesive layer agent 15 in which the liquid epoxy resin and the liquid curing agents are mixed is applied as illustrated in FIG. 4(B). The applying of the adhesive layer agent 15 is performed by, for example, ironing. Other applying methods such as spraying may, however, be used.

The adhesive layer agent 15 is the clear paint as mentioned above and is a mixture in which the liquid epoxy resin and the liquid mixed curing agent are mixed in the ratio of 2 to 1.

Next, the prepregs 17 are wound on the surface of the plating layer 5 on which the adhesive layer agent 15 is applied to form a wound product 19 as illustrated in FIG. 4(C).

According to the present embodiment, sheets of the prepregs 17 having given cut shapes and dimensions are sequentially wound and stacked around the element tube 3 having the plating layer 5.

Figure 5:
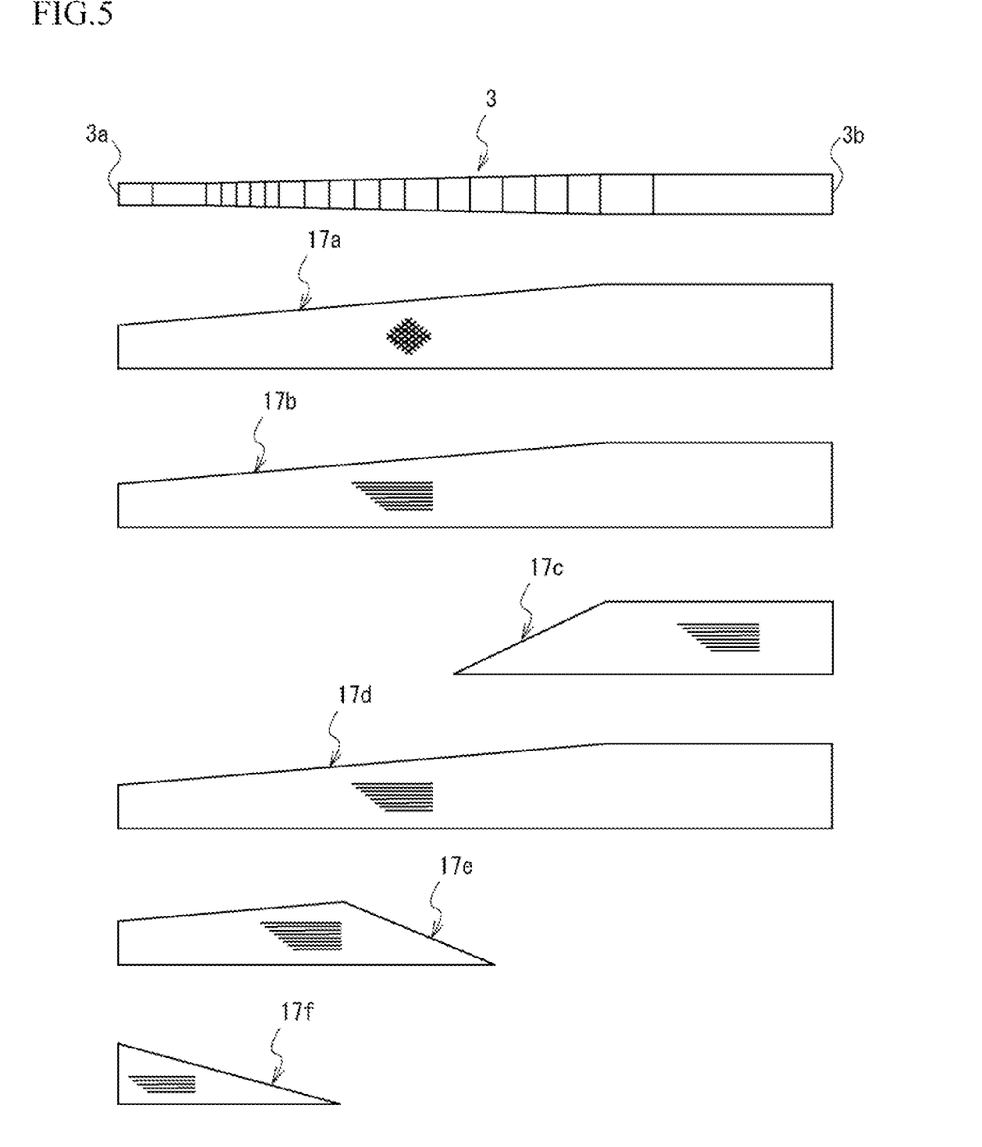
FIG. 5 is a development view illustrating sheets of prepregs to be stacked according to the Embodiment 1.

FIG. 5 is a development view of the sheets of the prepregs to be stacked.

According to the present embodiment, the 1st-6th prepregs 17a-17f having cut shapes and dimensions as illustrated in FIG. 5 are sequentially wound around given axial positions of the element tube 3, for example.

The 1st prepreg 17a is a stack of two sheets of prepregs of which fibers are oriented at angles of ±45° relative to the axial direction and is axially entirely wound around the element tube 3.

The 2nd prepreg 17b is a sheet of a prepreg of which fiber is oriented in the axial direction and is axially entirely wound around the element tube 3 similarly to the 1st prepreg 17a.

The 3rd prepreg 17c is a sheet of a prepreg of which fiber is oriented in the axial direction and is wound around a portion from an intermediate to the butt end 3b of the element tube 3. The 3rd prepreg 17c is stuck to the 4th prepreg 17d.

The 4th prepreg 17d is a sheet of a prepreg of which fiber is oriented in the axial direction similarly to the 2nd prepreg 17b and is axially entirely wound around the element tube 3 in a state of the 3rd prepreg 17c being stuck thereto.

The 5th prepreg 17e is a sheet of a prepreg of which fiber is oriented in the axial direction and is wound around a portion from the tip end 3a to the intermediate of the element tube 3.

The 6th prepreg 17f is a sheet of a prepreg of which fiber is oriented in the axial direction and is wound around an area shorter than for the 5th prepreg 17e from the tip end 3a to the intermediate.

In this way, the 1st-6th prepregs 17a-17f stacked are wound around the element tube 3 to form the wound product 19 of FIG. 4(C). It should be noted that as multiaxial fabrics such as four-axis or three-axis fabrics may be used as the 1st-6th prepregs 17a-17f. Further, the number of the layers, the shapes, the winding order or the like of the prepregs 17 are an example and may be determined according to performance or the like of a golf club.

Around the wound product 19, a holding tape 21 made of polypropylene or the like is wound on the outer periphery thereof to hold the winding state of the prepregs 17 as illustrated in FIG. 4(D).

Then, the wound product 19 around which the tape 21 is wounded is heated in a heating furnace to cure the prepregs 17 and the adhesive layer agent 15, thereby to form the outer layer 7 and the adhesive layer 9.

Thereafter, the tape 21 is removed and adjustment is performed to obtain a desired property by cutting the outer layer 7. At the time of this cutting, winding marks remaining on the outer layer 7 due to the tape 21 are removed to improve quality.

In this way, the golf shaft 1 in which the element tube 3 made of steel is covered with the outer layer 7 made of the fiber reinforced plastic is produced.

Figure 6:
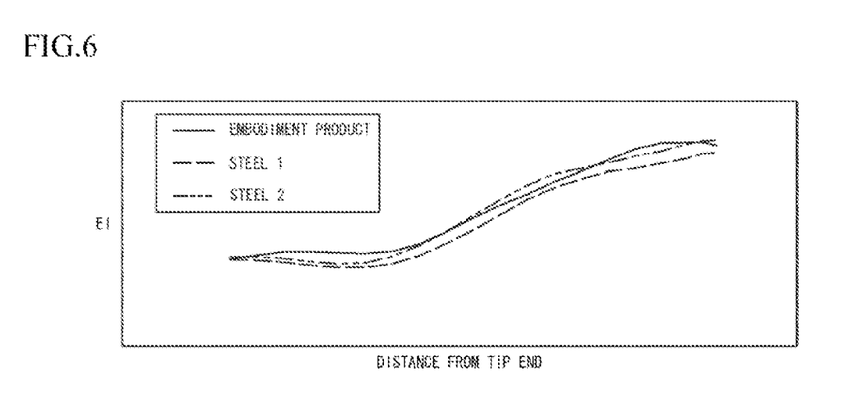
FIG. 6 is a graph schematically illustrating rigidity distribution of golf shafts according to the Embodiment 1.

FIG. 6 is a graph schematically illustrating rigidity distribution of golf shafts. In FIG. 6, the ordinate represents bending rigidity (EI) and the abscissa represents a distance from a tip end.

In FIG. 6, all of the steel 1, the steel 2, and the embodiment product are 41-inch golf shafts, the steel 1 and the steel 2 represent the golf shafts made of steel and the embodiment product represents the golf shaft 1 of the embodiment 1 in which the outer layer made of the fiber reinforced plastic is wound around the element tube 3 made of steel as mentioned above.

In the 41-inch golf shafts, in a case of ones made of steel, the weights were 120 g according to adjustment of the wall thicknesses to obtain the property (rigidity distribution) of FIG. 6. In the case of ones made of steel, it is hard to achieve both weight reduction and obtaining of a target property and weight reduction could not be performed further while keeping the property of FIG. 6.

On the other hand, the embodiment product could be reduced the weight to 90 g while obtaining the property equivalent to that of the golf shafts made of steel as illustrated in FIG. 6 by thinning the wall thickness of the element tube 3 made of steel, winding the outer layer 7 made of a fiber reinforced plastic on the outer periphery thereof and grinding the outer layer 7.

Figure 7:
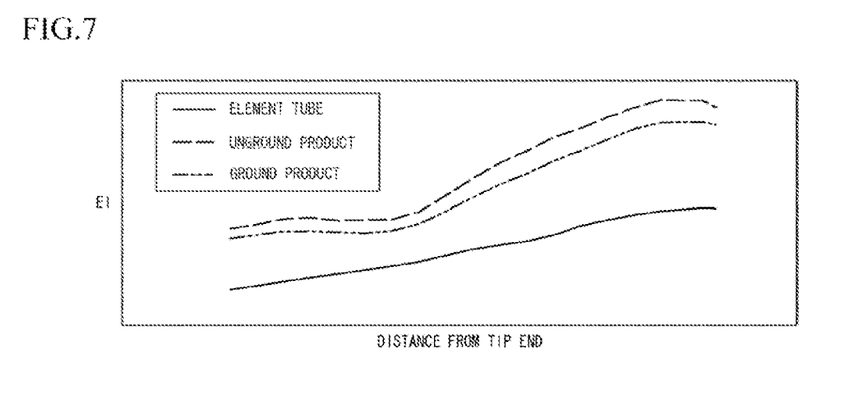
FIG. 7 is a graph illustrating change in rigidity distribution in the manufacturing process according to the Embodiment 1.

FIG. 7 illustrates change in rigidity distribution in the manufacturing process. It should be noted that the ordinate represents bending rigidity (EI) and the abscissa represents a distance from a tip end similarly to FIG. 6.

The element tube 3 of the embodiment product has a rigidity approximately linearly increasing from the tip end 3a to the butt end 3b as illustrated in FIG. 7 by reducing the wall thickness relative to the steel 1 and the steel 2 (element tube in FIG. 7). In this state, the weight of the element tube 3 is 70 g according to the present embodiment.

Then, the outer layer 7 is wound around the element tube 3 to obtain rigidity distribution following a target rigidity distribution, the rigidity distribution at this stage is wholly higher than the target rigidity distribution (unground product of FIG. 7). Thereafter, the property corresponding to FIG. 6 is obtained by grinding the outer layer 7 (ground product of FIG. 7). At this time, the weight of the golf shaft 1 is 90 g.

The golf shaft 1 of the present embodiment comprises the element tube 3 made of steel, the plating layer 5 formed on the outer periphery of the element tube 3, the outer layer 7 covering the plating layer 5, the adhesive layer 9 interposed between the plating layer 5 and the outer layer 7 to bond between the plating layer 5 and the outer layer 7.

The outer layer 7 is formed of the fiber reinforced plastic having the matrix resin that is the epoxy resin and the reinforcement that is the fiber sheet, and the adhesive layer 9 is the epoxy resin composition comprising the epoxy resin and the mixed curing agent in which two or more kinds of the amine-based curing agents are mixed.

The golf shaft 1 of the present embodiment, therefore, secures sufficient adhesion between the outer layer 7 and the element tube 3 without lapping the plating layer 5 composing the surface of the element tube 3 by interposition of the adhesive layer 9 having high adhesion relative to the outer layer 7 and the plating layer 5.

The embodiment 2 changes the material of the adhesive layer 9 with respect to the embodiment 1 to a carbon nano tube resin composition. In addition, the embodiment 2 is the same as the embodiment 1 with the exception of the material of the adhesive layer 9 and therefore FIGS. 1-3 of the embodiment 1 are referred for the structure to eliminate repetition in a description. The wall thickness of the adhesive layer 9 is, however, about 0.06 mm according to the present embodiment whereas that of the embodiment 1 is about 0.02 mm.

The carbon nano tube resin composition comprises an epoxy resin and at least one kind of curing agents as well as dispersed carbon nano tubes.

According to the present embodiment, not only the amine-based curing agents but also acid anhydride-based curing agents or the like may be used as the curing agents. The carbon nano tubes dispersed in the adhesive layer 9 have outer diameters of approximate 0.5-100 nm and lengths of several nm-several mm.

Figure 8:
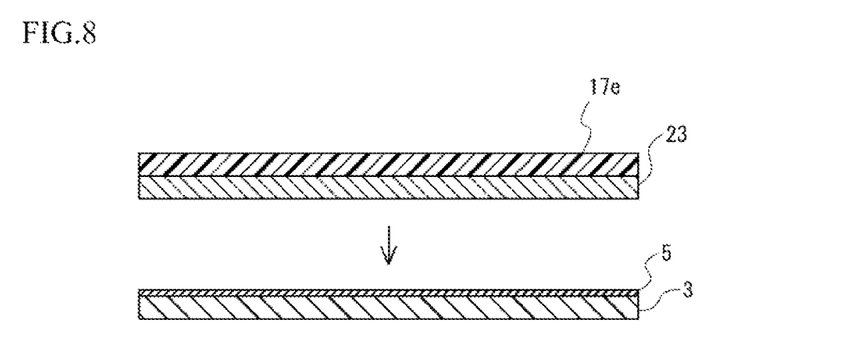
FIG. 8 is a sectional view illustrating a state of an adhesive layer sheet being stuck on a 1st prepreg at the time of manufacturing a golf shaft according to the Embodiment 2 of the present invention.

The adhesive layer 9 of the present embodiment is formed by curing a gel adhesive layer sheet 23 with heat. Before curing, the adhesive layer sheet 23 is a resin film that contains 0.5-10% (weight) carbon nano tubes, preferably 1-5% carbon nano tubes. It should be noted that the aforementioned content ratio of the component is an example and may be changed appropriately.

FIG. 8 is a sectional view illustrating a state of the adhesive layer sheet 23 being stuck on the 1st prepreg 17*a* at the time of manufacturing the golf shaft 1.

When manufacturing the golf shaft 1, the adhesive layer sheet 23 is stuck on the 1st prepreg 17*a*, and then the 1st prepreg 17*a* is stuck on the plating layer 5 of the element tube 3 with the adhesive layer sheet 23. Thereafter, the 2nd-6th prepregs 17*b*-17*f* are stacked to form the wound product 19 and heating is conducted thereto after keeping the winding state using the tape 21, and the cured outer layer 7 is ground to obtain a desired property similarly to the embodiment 1.

The embodiment 2 provides the same effects as the embodiment 1. Further, according to the embodiment 2, the adhesive layer 9 is the carbon nano tube resin composition comprising the epoxy resin and at least one kind of the curing agents as well as the dispersed carbon nano tubes, and therefore it increases strength relative to the embodiment 1.

The invention claimed is:

1. A golf shaft comprising:
   an element tube made of steel;
   a plating layer formed on an outer periphery of the element tube;
   an outer layer covering the plating layer;
   an adhesive layer interposed between the plating layer and the outer layer to bond between the plating layer and the outer layer, wherein
   the outer layer is formed of a fiber reinforced plastic having a matrix resin that is an epoxy resin,
   the adhesive layer is an epoxy resin composition, the epoxy resin composition comprising an epoxy resin and a mixed curing agent in which two or more kinds of amine-based curing agents selected from aliphatic polyamine, alicyclic polyamine, aromatic polyamine, and polyamideamine are mixed, and
   the adhesive layer has higher adhesion relative to the plating layer and the outer layer than adhesion of direct bonding of the plating layer and the outer layer.

2. The golf shaft according to claim 1, wherein the amine-based curing agents are two kinds of amine-based curing agents in which one is triethylenetetramine and another one is polyamideamine that are blended so that there is more polyamideamine than triethylenetetramine.

\* \* \* \* \*